(12) United States Patent
Bender et al.

(10) Patent No.: US 11,612,920 B2
(45) Date of Patent: Mar. 28, 2023

(54) DEVICE FOR ADJUSTING AN OBJECT

(71) Applicant: SMS group GmbH, Düsseldorf (DE)

(72) Inventors: Hans-Jürgen Bender, Olpe (DE); Volker Paersch, Hilchenbach (DE)

(73) Assignee: SMS group GmbH, Düsseldorf (DE)

( * ) Notice: Subject to any disclaimer, the term of this patent is extended or adjusted under 35 U.S.C. 154(b) by 157 days.

(21) Appl. No.: 17/272,454

(22) PCT Filed: Aug. 16, 2019

(86) PCT No.: PCT/EP2019/072035
§ 371 (c)(1),
(2) Date: Mar. 1, 2021

(87) PCT Pub. No.: WO2020/043514
PCT Pub. Date: Mar. 5, 2020

(65) Prior Publication Data
US 2021/0316346 A1 Oct. 14, 2021

(30) Foreign Application Priority Data
Aug. 29, 2018 (DE) ............. 10 2018 214 583.0

(51) Int. Cl.
*B21B 31/18* (2006.01)
*B21B 31/07* (2006.01)
*B21B 31/22* (2006.01)

(52) U.S. Cl.
CPC ............ *B21B 31/18* (2013.01); *B21B 31/07* (2013.01); *B21B 31/22* (2013.01)

(58) Field of Classification Search
CPC ......... B21B 31/20; B21B 31/22; B21B 31/24; B23Q 5/28; B23Q 5/402
See application file for complete search history.

(56) References Cited

U.S. PATENT DOCUMENTS

| | | | | |
|---|---|---|---|---|
| 3,486,393 A * | 12/1969 | Maxwell | ................. | B21B 31/24 74/89.42 |
| 4,007,618 A * | 2/1977 | Ponter | .................... | B21B 31/32 72/245 |
| 4,192,165 A * | 3/1980 | Vydrin | ................. | B21B 13/103 72/224 |
| 6,796,198 B2 * | 9/2004 | Broetto | ................. | H02K 21/14 74/89.17 |
| 2010/0101343 A1 * | 4/2010 | Shirai | ...................... | B23Q 5/40 74/89.34 |

OTHER PUBLICATIONS

JP 10-299770 A, Nov. 1998 Lindskog et al.*
DE 102008033872 A1, Jan. 2010 Neustadt.*
WO 02/076644 A1, Oct. 2002 Abramenko et al.*
WO 2009/021591 A1, Feb. 2009 Dittes.*

* cited by examiner

*Primary Examiner* — Edward T Tolan
(74) *Attorney, Agent, or Firm* — Maier & Maier, PLLC

(57) ABSTRACT

A device for adjusting an object, for example a roll in a roll stand including a rotatably mounted pressure spindle and a torque motor having a stator and a rotor for rotationally driving the pressure spindle. In addition, the device includes a fixedly arranged pressure nut, which is engaged with the pressure spindle in a rotationally coupled manner via a thread to generate an axial movement of the pressure spindle in case of its rotation. Due to the axial movement generated in this way, the device can generate an axial adjustment force and transmit it to the object to be adjusted.

16 Claims, 1 Drawing Sheet

DEVICE FOR ADJUSTING AN OBJECT

FIELD

The invention relates to a device for adjusting an object, for example a roll in a roll stand for rolling metallic rolled material, or for adjusting a pressure ram in a slab sizing press.

BACKGROUND

Such adjusting devices are known in principle in the prior art, for example from German published patent application DE 10 2013 224 644 A1. This prior art discloses all of the features of the preamble of claim 1. Specifically, this published patent application discloses a device for adjusting a roll in a roll stand, wherein the device includes the following: A rotatably mounted pressure spindle and a torque motor having a stator and a rotor for rotating the pressure spindle, wherein the stator is designed in the form of at least one electromagnetic coil and is fixedly installed. In addition, the device comprises a fixedly mounted pressure nut in which the pressure spindle is rotatably mounted. The pressure nut is engaged with the pressure spindle via a thread. The pressure nut and the thread have the function of generating an axial movement of the pressure spindle in case of its rotation and of generating and transmitting an axial adjustment force to the object, in particular the roll.

In this known embodiment of the device, the torque motor for driving the pressure spindle is arranged frontally at one end of the device; the traditional device therefore has a relatively tall or long construction. With this traditional solution, the torque of the motor is transmitted to the pressure spindle via an axially mounted driveshaft via a multispline hub/multispline shaft connection. This constructive solution is complex and cost-intensive and also requires an increased effort for maintenance and operation.

European patent application EP 2 650 072 A1 discloses an automatic thread cutting machine which includes an electric motor. The electric motor includes a stator and a rotor as well as a spindle for holding and rotationally moving a tool, in particular a thread cutter. The spindle is arranged in a cavity within the rotor.

SUMMARY

Proceeding from this prior art, the invention is based on the object of providing alternative uses for the known device for adjusting an object.

Accordingly, the device according to the invention is used for adjusting a roll in a roll stand.

The device according to the invention can also be used for adjusting a pressure ram in a slab sizing press.

In the solution according to the invention, the torque motor is no longer seated frontally at one axial end of the device, but rather is designed and arranged here with its stator and rotor coaxial to the motor-side end of the pressure spindle and at its axial height. The driveshaft still required in the prior art as the axial connection between the motor and the pressure spindle can be omitted without replacement. The device according to the invention therefore has a shorter and more compact construction. The electromotive drive components such as magnets and the coils of the stator are advantageously integrated directly into the mechanism of the adjustment system or the device. The overall device has a simpler mechanical design in particular due to the omission of the driveshaft. In addition, the control characteristic is overall more rigid than in the known solution from the prior art. The claimed device is less complex, has lower manufacturing costs and is easier to assemble in the workshop and at the customer. It requires less maintenance in operation and lower operating costs, in particular because less lubricating oil has to be used. In addition, the power consumption is lower or the efficiency is higher.

The stator is fixedly arranged, i.e., so it is neither rotatable nor axially displaceable. The rotor is rotatably mounted inside the stator, but is fixed in the axial direction on the region of the stator. It is thus ensured that the torque motor always exerts an equal torque on the rotor. It is ensured by the hub/shaft connection (=spline gearing) between the rotor and the pressure spindle that the pressure spindle is displaceably mounted axially in relation to the rotor, and that nonetheless said torque is always transmitted in full strength from the rotor to the pressure spindle, independently of how the pressure spindle is located axially in relation to the rotor or is displaced axially in relation thereto. In particular, the same torque is transmitted to the pressure spindle even if it plunges only partially or not at all into the rotor or stator. The requirement is always only that the pressure spindle is at least somewhat engaged with the rotor via the spline gearing.

According to a first exemplary embodiment, it is advantageous if a permanent magnet is attached on the periphery of the rotor. This increases the efficiency of the torque motor. It is particularly advantageous to manufacture the permanent magnet from a rare earth metal, for example neodymium, because it enables particularly strong magnetic fields to be generated. In order not to negatively influence the effect of the permanent magnet, it is advantageous if the rotor, i.e., the multispline hub, is manufactured at least partially or entirely from a non-magnetic material.

With regard to the best possible and simple integration of the electromotive components into the mechanics of the adjustment system, it is advantageous if the stator and/or the pressure nut are each fixedly installed on a housing of the device.

In addition, it is advantageous if the rotor in the form of the multispline hub is fastened on the housing fixedly in the axial direction, but rotatably mounted.

Finally, it is reasonable if a braking device is provided for braking and holding the rotor.

BRIEF DESCRIPTION OF THE FIGURES

The description is accompanied by a single drawing, FIG. 1, which shows the device according to the invention in a longitudinal section.

In the following, the invention will be described in detail with reference to this drawing in the form of exemplary embodiments.

DETAILED DESCRIPTION

Figure 1:
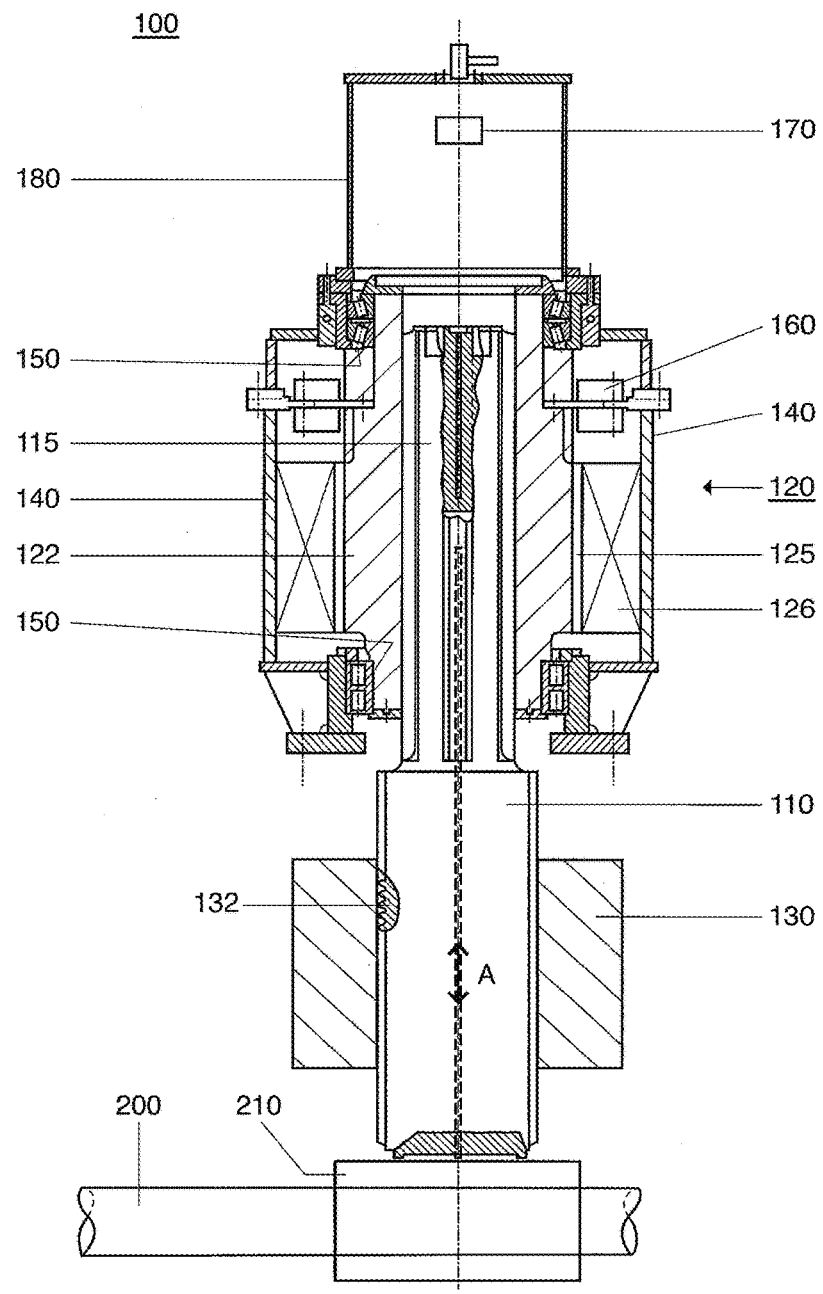

The core of the device 100 according to the invention is a pressure spindle 110, which is rotationally driven with the aid of a torque motor 120, consisting of a stator 126 and a rotor in the form of a spline hub 122. For this purpose, the motor-side end of the pressure spindle 110 is designed in the form of a multispline shaft 115 which engages in a rotationally coupled manner with the multispline hub 122 enclosing it coaxially. This means: When the rotor or the multispline hub 122 rotates, the pressure spindle is automatically rotationally driven or rotated due to the above-mentioned coupling via the multispline gearing (multispline hub in connection with the multispline shaft).

The rotor or the multispline hub 122 is rotatably mounted in a housing 140 of the device via roller bearings 150. At the upper end of the device, this roller bearing 150 is preferably designed as a tapered roller bearing, while the roller bearing 150 at the lower end of the rotor is preferably designed in the form of a cylindrical roller bearing. The rotor or the multispine hub 122 is fixed in the axial direction A, i.e., it is not axially displaceable. Permanent magnets 125 are fastened on the periphery of the rotor to amplify the torque generated by the torque motor. These permanent magnets are preferably manufactured from a rare earth metal, for example neodymium, because a particularly strong magnetic field can be generated with them.

In addition to the rotor 122, the torque motor 120, as mentioned, also includes a stator 126. This is typically designed in the form of an electromagnetic coil, which is fixedly installed on the housing 140 of the device and coaxially encloses the rotor. In the present case, the torque motor 120 is designed as an internal rotor motor, i.e., the rotor 122 runs in the stator 126.

The motor-side end 115 of the pressure spindle 110 that is rotationally coupled via the multispline gear or the multispline hub 122 can be tapered in relation to its end remote from the engine, as shown in FIG. 1. The tapered design of the motor-side end of the pressure spindle contributes to the compact design of the device in the radial direction.

The motor-remote region of the pressure spindle 110 is screwed into a fixedly arranged pressure nut 130, i.e., it is rotatably mounted in the pressure nut 130 via a thread 132.

Finally, it can be seen in the FIGURE that a braking device 160 is provided for braking and holding the motor. At the end opposite to the pressure nut, the device 100 preferably has a protective hood 180 on the front end, in which a displacement transducer 170 can be arranged. This displacement transducer 170 is used to detect the axial position or displacement position of the pressure spindle 110.

The functioning of the device according to the invention is briefly explained again below:

The torque motor 120 generates using its stator 126, i.e., using an electromagnetic coil, a magnetic field with the aid of which the rotor running in the stator 126, i.e., the multispline hub 122, is rotationally driven. The rotating multispline hub 122 sets the pressure spindle 110, which is rotatably coupled to it, into synchronous rotation. In particular, by providing the strong permanent magnet 125 between the stator and the rotor, the torque motor can exert or transmit a very high torque to the pressure spindle 110. In its motor-remote region, the pressure spindle 110 has an external thread on its outside which engages in an internal thread of the fixedly mounted pressure nut 130. In case of a rotation of the pressure spindle, it is also moved in the axial direction A due to the interaction with the fixed pressure nut 130. This axial movement enables the exertion of an axial adjustment force of the pressure spindle 110 against an object, for example against the chock 210 of a roll 200 in a roll stand or against a pressure ram in a slab sizing press.

LIST OF REFERENCE SIGNS 100 device
110 pressure spindle
115 multispline shaft
120 torque motor
122 rotor or multispline hub
125 permanent magnet
126 stator
130 pressure nut
132 thread
140 housing
150 roller bearings
160 braking device
170 displacement transducer
180 protective cover
200 roll
210 chock or bearing of the roller
A axial direction

The invention claimed is:

1. A device for adjusting an object, comprising:
a rotatably mounted pressure spindle;
a torque motor having a stator and a rotor for rotating the pressure spindle, wherein the stator is designed in the form of at least one electromagnetic coil and is fixedly installed;
a fixedly arranged pressure nut, which is engaged in a rotationally coupled manner via a thread with the pressure spindle to generate an axial movement of the pressure spindle in case of its rotation and to generate and transmit an axial adjusting force to the object;
wherein
the torque motor is designed as an internal rotor motor, wherein the rotor rotates in the stator;
the rotor of the torque motor is designed in the form of a rotatably mounted multi-spline hub, and
the motor-side end of the pressure spindle is designed in the form of a multi-spline shaft, which is inserted into the multi-spline hub and is engaged in a rotationally-coupled manner with the multi-spline hub to rotate the pressure spindle;
to adjust a roll as the object in a roll stand for rolling metallic rolled material.

2. A device for adjusting an object, comprising:
a rotatably mounted pressure spindle;
a torque motor having a stator and a rotor for rotating the pressure spindle, wherein the stator is designed in the form of at least one electromagnetic coil and is fixedly installed;
a fixedly arranged pressure nut, which is engaged in a rotationally coupled manner via a thread with the pressure spindle to generate an axial movement of the pressure spindle in case of its rotation and to generate and transmit an axial adjusting force to the object;
wherein
the torque motor is designed as an internal rotor motor, wherein the rotor rotates in the stator;
the rotor of the torque motor is designed in the form of a rotatably mounted multi-spline hub, and
the motor-side end of the pressure spindle is designed in the form of a multi-spline shaft, which is inserted into the multi-spline hub and is engaged in a rotationally-coupled manner with the multi-spline hub to rotate the pressure spindle;
to adjust a pressure ram as the object in a slab upsetting press.

3. A roll stand, comprising:
a roll for rolling metallic rolled material,
wherein a device for adjusting the roll, comprising:
a rotatably mounted pressure spindle;
a torque motor having a stator and a rotor for rotating the pressure spindle, wherein the stator is designed in the form of at least one electromagnetic coil and is fixedly installed;

a fixedly arranged pressure nut, which is engaged in a rotationally coupled manner via a thread with the pressure spindle to generate an axial movement of the pressure spindle in case of its rotation and to generate and transmit an axial adjusting force to the object;

wherein the torque motor is designed as an internal rotor motor;

the rotor rotates in the stator;

the rotor of the torque motor is designed in the form of a rotatably mounted multi-spline hub, and the motor-side end of the pressure spindle is designed in the form of a multi-spline shaft, which is inserted into the multi-spline hub and is engaged in a rotationally-coupled manner with the multi-spline hub to rotate the pressure spindle.

4. The roll stand as claimed in claim 3, wherein the multi-spline hub is manufactured from a nonmagnetic material.

5. The roll stand as claimed in claim 3, wherein a housing, on which the stator is fixedly mounted, the pressure nut is fixedly mounted, and/or the rotor in the form of the multi-spline hub is fixedly mounted in the axial direction but is rotatably mounted.

6. The roll stand as claimed in claim 3, wherein a braking device for braking and holding the rotor.

7. The roll stand as claimed in claim 3, wherein a displacement transducer for detecting the axial position or displacement position of the pressure spindle.

8. The roll stand as claimed in claim 3, wherein at least one permanent magnet is attached on the periphery of the rotor.

9. The roll stand as claimed in claim 4, wherein a housing, on which the stator is fixedly mounted, the pressure nut is fixedly mounted, and/or the rotor in the form of the multi-spline hub is fixedly mounted in the axial direction but is rotatably mounted.

10. The roll stand as claimed in claim 4, wherein a displacement transducer for detecting the axial position or displacement position of the pressure spindle.

11. The roll stand as claimed in claim 5, wherein a displacement transducer for detecting the axial position or displacement position of the pressure spindle.

12. The roll stand as claimed in claim 6, wherein a displacement transducer for detecting the axial position or displacement position of the pressure spindle.

13. The roll stand as claimed in claim 4, wherein at least one permanent magnet is attached on the periphery of the rotor.

14. The roll stand as claimed in claim 5, wherein at least one permanent magnet is attached on the periphery of the rotor.

15. The roll stand as claimed in claim 6, wherein at least one permanent magnet is attached on the periphery of the rotor.

16. The roll stand as claimed in claim 7, wherein at least one permanent magnet is attached on the periphery of the rotor.

* * * * *